(12) United States Patent
Carlson et al.

(10) Patent No.: US 11,148,210 B2
(45) Date of Patent: *Oct. 19, 2021

(54) DRILL STAND

(71) Applicant: MILWAUKEE ELECTRIC TOOL CORPORATION, Brookfield, WI (US)

(72) Inventors: Mitchell Carlson, Lisbon, WI (US); Ligan Wu, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,444

(22) Filed: Sep. 16, 2020

(65) Prior Publication Data

US 2020/0406373 A1     Dec. 31, 2020

Related U.S. Application Data

(63) Continuation of application No. 16/390,361, filed on Apr. 22, 2019, now Pat. No. 10,821,525.

(30) Foreign Application Priority Data

Apr. 24, 2018   (CN) .......................... 201820589494.5

(51) Int. Cl.
| B23B 47/28 | (2006.01) |
| F16M 11/04 | (2006.01) |
| F16M 11/18 | (2006.01) |
| F16M 11/38 | (2006.01) |
| B25H 1/00 | (2006.01) |
| E21B 7/02 | (2006.01) |

(52) U.S. Cl.
CPC ........... *B23B 47/28* (2013.01); *B25H 1/0042* (2013.01); *B25H 1/0064* (2013.01); *F16M 11/046* (2013.01); *F16M 11/18* (2013.01); *F16M 11/38* (2013.01); *E21B 7/02* (2013.01)

(58) Field of Classification Search
CPC .... B25H 1/0064; B25H 1/0042; B23B 47/28; F16M 11/046
See application file for complete search history.

(56) References Cited

U.S. PATENT DOCUMENTS

| 2,151,205 A | 3/1939 | Hawn |
| 2,466,965 A | 4/1949 | Pitts |
| 2,629,267 A | 2/1953 | Hart |
| 2,765,996 A | 10/1956 | Anderson |
| 2,910,895 A | 11/1959 | Winslow |
| 3,033,298 A | 5/1962 | Johnson |

(Continued)

FOREIGN PATENT DOCUMENTS

| DE | 3434260 A1 | 3/1986 |
| DE | 29604902 U1 | 5/1996 |

(Continued)

*Primary Examiner* — Bradley Duckworth
(74) *Attorney, Agent, or Firm* — Michael Best & Friedrich LLP

(57) ABSTRACT

A drill stand comprises a base, a mast defining a longitudinal axis and pivotably coupled to the base, a support bracket moveably coupled to the mast and pivotably coupled to the base, and a carriage moveably coupled to the mast. The carriage is configured to selectively receive a drill and is selectively removable from the mast in a tool-free manner.

16 Claims, 9 Drawing Sheets

(56) References Cited

U.S. PATENT DOCUMENTS

| | | | |
|---|---|---|---|
| 3,412,813 | A | 11/1968 | Johnson |
| 3,456,738 | A | 7/1969 | Harry |
| 3,464,655 | A | 9/1969 | Schuman |
| 3,915,241 | A | 10/1975 | Bieri |
| 4,013,133 | A | 3/1977 | Bier |
| 4,029,160 | A | 6/1977 | Leidvik |
| 4,205,728 | A | 6/1980 | Gloor et al. |
| 4,234,155 | A | 11/1980 | Destree |
| 4,269,383 | A | 5/1981 | Hackman et al. |
| 4,349,945 | A | 9/1982 | Fox |
| 4,375,931 | A | 3/1983 | Erdt |
| 4,540,149 | A | 9/1985 | Rupprecht et al. |
| 4,582,460 | A | 4/1986 | Silverberg et al. |
| 4,597,185 | A | 7/1986 | Ury |
| 5,004,055 | A | 4/1991 | Porritt et al. |
| 5,051,044 | A | 9/1991 | Allen |
| 5,681,022 | A | 10/1997 | Rankin |
| 5,713,702 | A | 2/1998 | Turner |
| 5,794,724 | A | 8/1998 | Moller |
| 5,885,036 | A | 3/1999 | Wheeler |
| 5,915,894 | A | 6/1999 | Okada et al. |
| 6,394,717 | B1 | 5/2002 | Mazaki et al. |
| 6,675,913 | B2 | 1/2004 | Martin |
| 6,692,201 | B2 | 2/2004 | Soderman |
| 6,792,735 | B2 | 9/2004 | Mohlenhoff |
| 6,851,900 | B2 | 2/2005 | Tillemans et al. |
| 7,070,366 | B2 | 7/2006 | Reichenberger et al. |
| 7,210,878 | B2 | 5/2007 | Koslowski et al. |
| 7,214,007 | B2 | 5/2007 | Baratta |
| 7,487,576 | B2 | 2/2009 | Baratta et al. |
| 8,245,997 | B2 | 8/2012 | Baratta |
| 8,375,541 | B1 | 2/2013 | Beachy et al. |
| 8,545,139 | B2 | 10/2013 | Beichter et al. |
| 8,757,937 | B1 | 6/2014 | Inman et al. |
| 8,813,588 | B2 | 8/2014 | Sattler |
| 8,888,417 | B2 | 11/2014 | Jonsson et al. |
| 9,061,414 | B2 | 6/2015 | Sattler |
| 9,168,591 | B2 | 10/2015 | Fischinger et al. |
| 9,174,283 | B2 | 11/2015 | Timmons et al. |
| 9,555,481 | B2 | 1/2017 | Nowland |
| 9,782,865 | B2 | 10/2017 | Richt et al. |
| 10,821,525 | B2 * | 11/2020 | Carlson ............... F16M 11/046 |
| 2003/0111266 | A1 | 6/2003 | Roach |
| 2003/0167728 | A1 | 9/2003 | Mohlenhoff |
| 2003/0221868 | A1 | 12/2003 | Martin |
| 2004/0009045 | A1 | 1/2004 | Reichenberger et al. |
| 2004/0253064 | A1 | 2/2004 | Koslowski et al. |
| 2006/0118338 | A1 | 6/2006 | Maybury, Jr. |
| 2006/0285932 | A1 | 12/2006 | Park |
| 2007/0086868 | A1 | 4/2007 | Ray |
| 2007/0217879 | A1 | 9/2007 | Larsson |
| 2010/0264292 | A1 | 10/2010 | Baratta |
| 2010/0290847 | A1 | 11/2010 | Beichter et al. |
| 2010/0290848 | A1 | 11/2010 | Baratta |
| 2012/0145423 | A1 | 6/2012 | Sattler |
| 2012/0148176 | A1 | 6/2012 | Sattler |
| 2013/0004255 | A1 | 1/2013 | Fischinger et al. |
| 2013/0039711 | A1 | 2/2013 | Jonsson et al. |
| 2015/0321266 | A1 | 11/2015 | Sattler et al. |
| 2015/0352708 | A1 | 12/2015 | Taack-Trakanen |
| 2016/0151873 | A1 | 6/2016 | Richt et al. |
| 2017/0274487 | A1 | 9/2017 | Sattler |
| 2018/0119536 | A1 | 5/2018 | Drexl et al. |
| 2018/0133929 | A1 | 5/2018 | Drexl et al. |
| 2018/0297126 | A1 | 10/2018 | Drexl et al. |
| 2018/0297235 | A1 | 10/2018 | Drexl et al. |

FOREIGN PATENT DOCUMENTS

| | | |
|---|---|---|
| DE | 29802393 U1 | 6/1998 |
| DE | 10064173 C1 | 6/2002 |
| DE | 102015105288 A1 | 10/2016 |
| EP | 0712686 A1 | 5/1996 |
| EP | 0791424 A2 | 8/1997 |
| EP | 0894579 A1 | 2/1999 |
| EP | 1642686 A2 | 4/2006 |
| GB | 2321608 A | 8/1998 |
| WO | 9606714 A1 | 3/1996 |
| WO | 9937448 A1 | 7/1999 |
| WO | 2008026971 A1 | 3/2008 |
| WO | 2008026974 A1 | 3/2008 |
| WO | 2008026975 A1 | 3/2008 |
| WO | 2008130304 A1 | 10/2008 |
| WO | 2009051522 A1 | 4/2009 |
| WO | 2009051523 A1 | 4/2009 |
| WO | 2009051524 A1 | 4/2009 |
| WO | 2010059084 A1 | 5/2010 |

* cited by examiner

DRILL STAND

CROSS-REFERENCE TO RELATED APPLICATIONS

This application is a continuation of co-pending U.S. patent application Ser. No. 16/390,361 filed on Apr. 22, 2019, now U.S. Pat. No. 10,821,525, which claims foreign priority to Chinese Utility Model Application No. 201820589494.5 filed on Apr. 24, 2018, the entire content of which are incorporated herein by reference.

FIELD OF THE INVENTION

The present invention relates to stands, and more particularly to drill stands.

BACKGROUND OF THE INVENTION

Larger drills, such as core drills, require stands upon which they can be mounted. The stands can often be mounted against a horizontal surface, such as the ground, or a vertical wall.

SUMMARY OF THE INVENTION

The present invention provides, in one aspect, a drill stand comprising a base, a mast defining a longitudinal axis and pivotably coupled to the base, a support bracket moveably coupled to the mast and pivotably coupled to the base, and a carriage moveably coupled to the mast. The carriage is configured to selectively receive a drill and is selectively removable from the mast in a tool-free manner.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
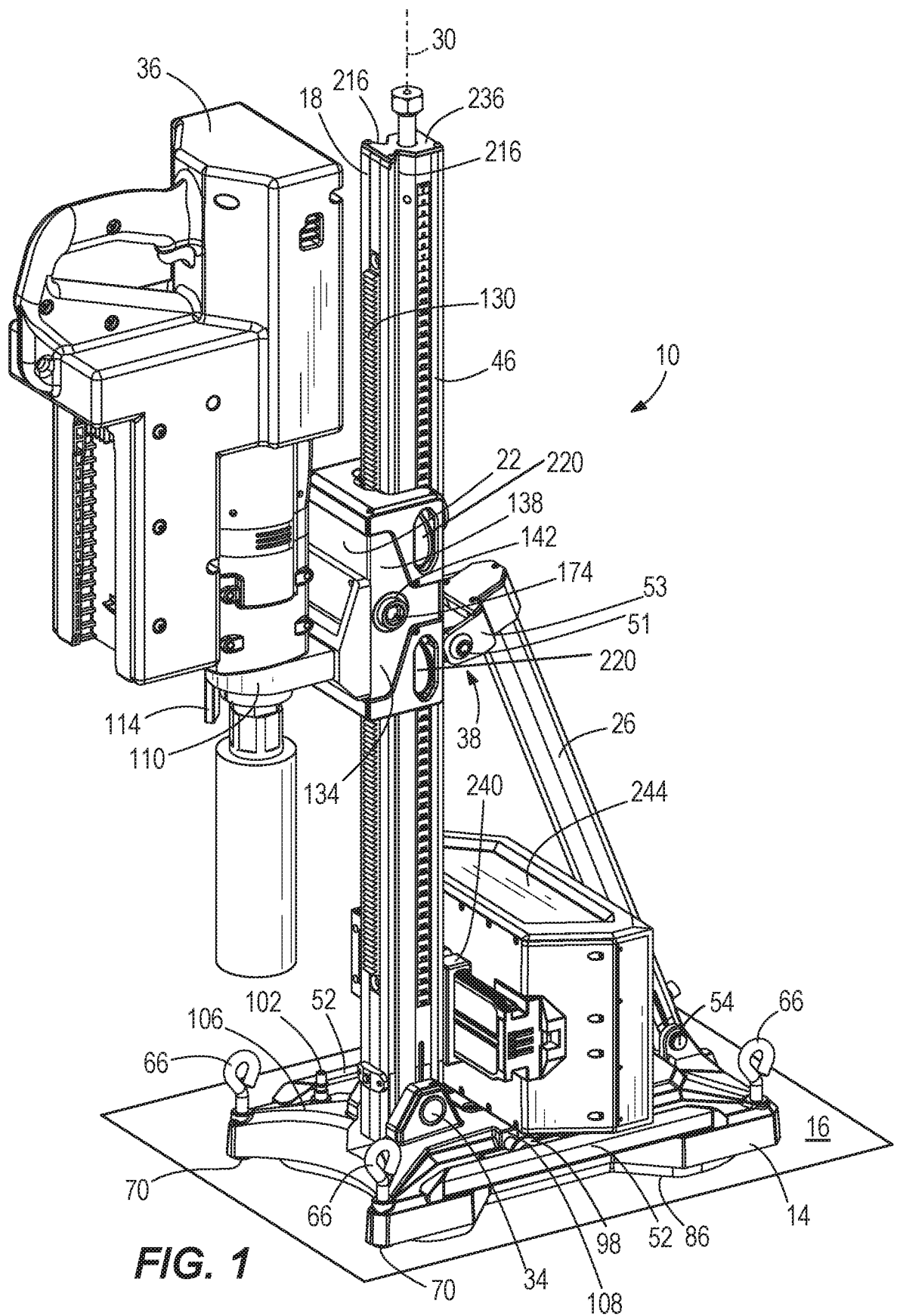
FIG. 1 is a perspective view of a drill stand with a core drill and a battery attached.
Figure 2:
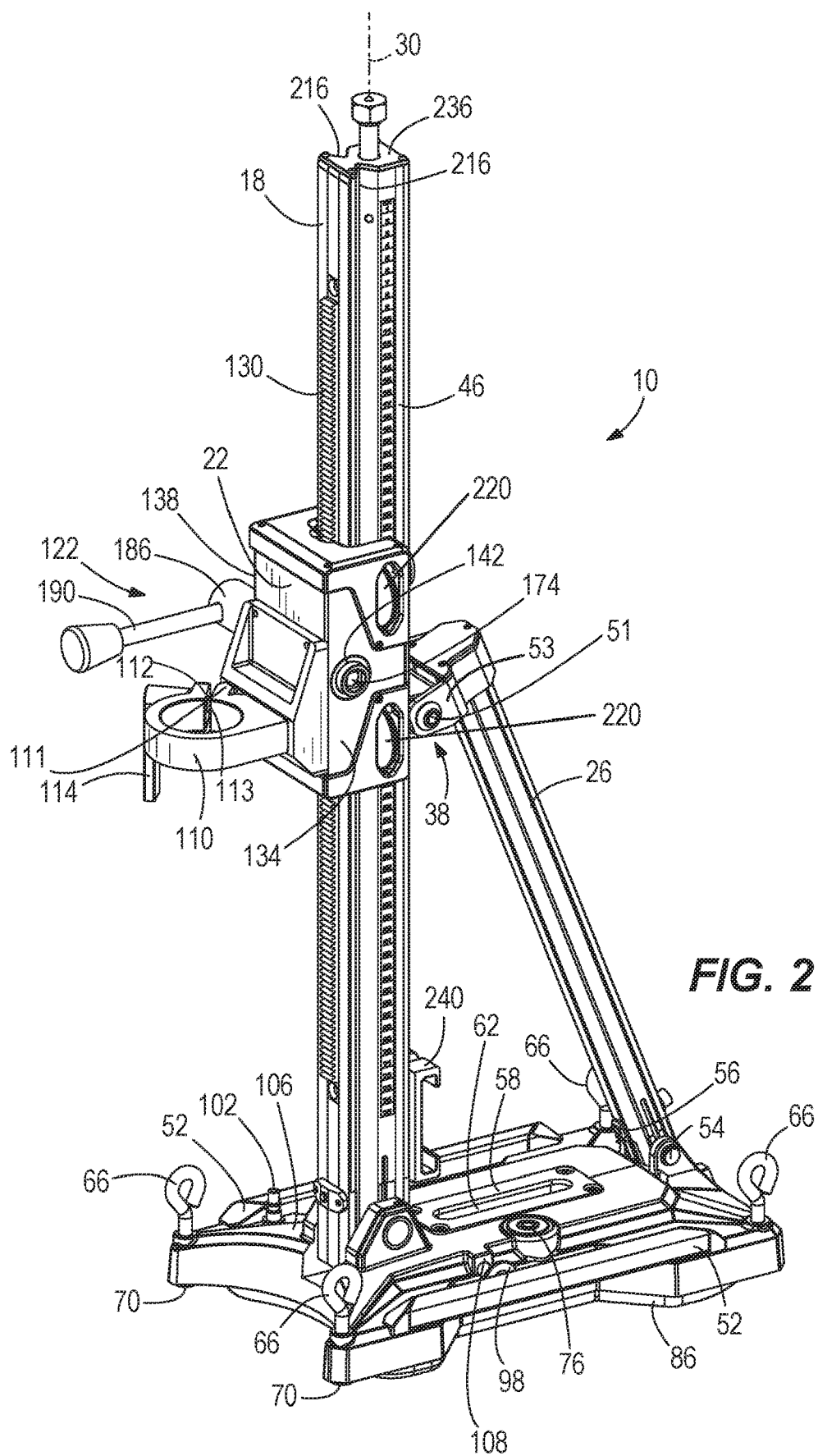
FIG. 2 is a perspective view of the drill stand of FIG. 1 with the core drill and the battery removed.

FIGS. 1-4 illustrate a drill stand 10 including a base 14 for mounting on a mounting surface 16 that can be vertical (e.g. a wall) or horizontal (e.g. the ground, as shown in FIG. 1). The drill stand 10 also includes a mast 18 for supporting a carriage 22, and a support bracket 26 moveably coupled to the mast 18 and the base 14. The mast 18 defines a longitudinal axis 30 and is pivotably coupled to the base 14 to pivot about a pivot joint 34. The carriage 22 is moveably coupled to the mast 18 and is configured to carry a core drill 36, as described in further detail below.

Figure 3:
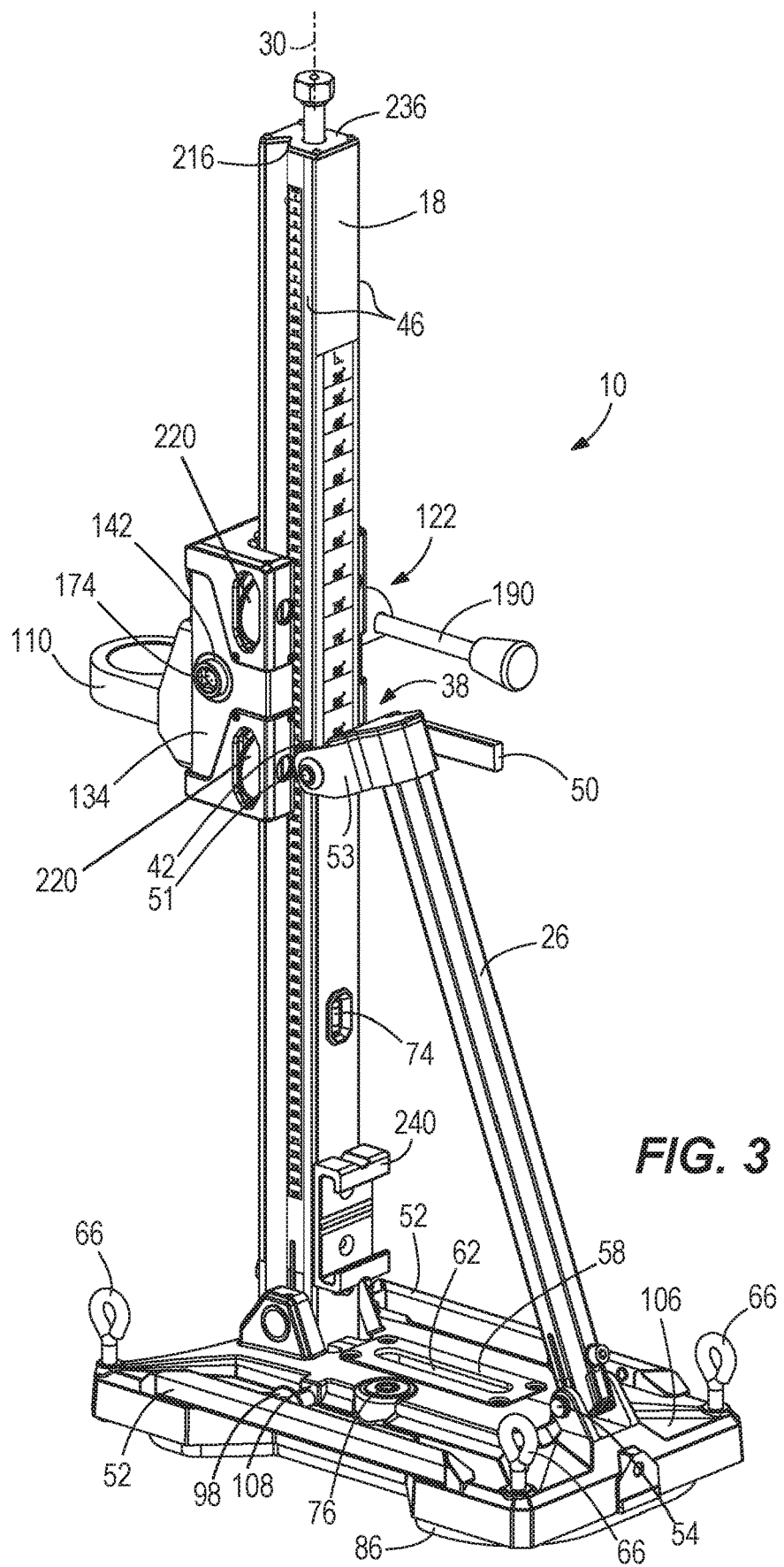
FIG. 3 is a rear perspective view of the drill stand of FIG. 1 with the core drill and the battery removed.
Figure 4:
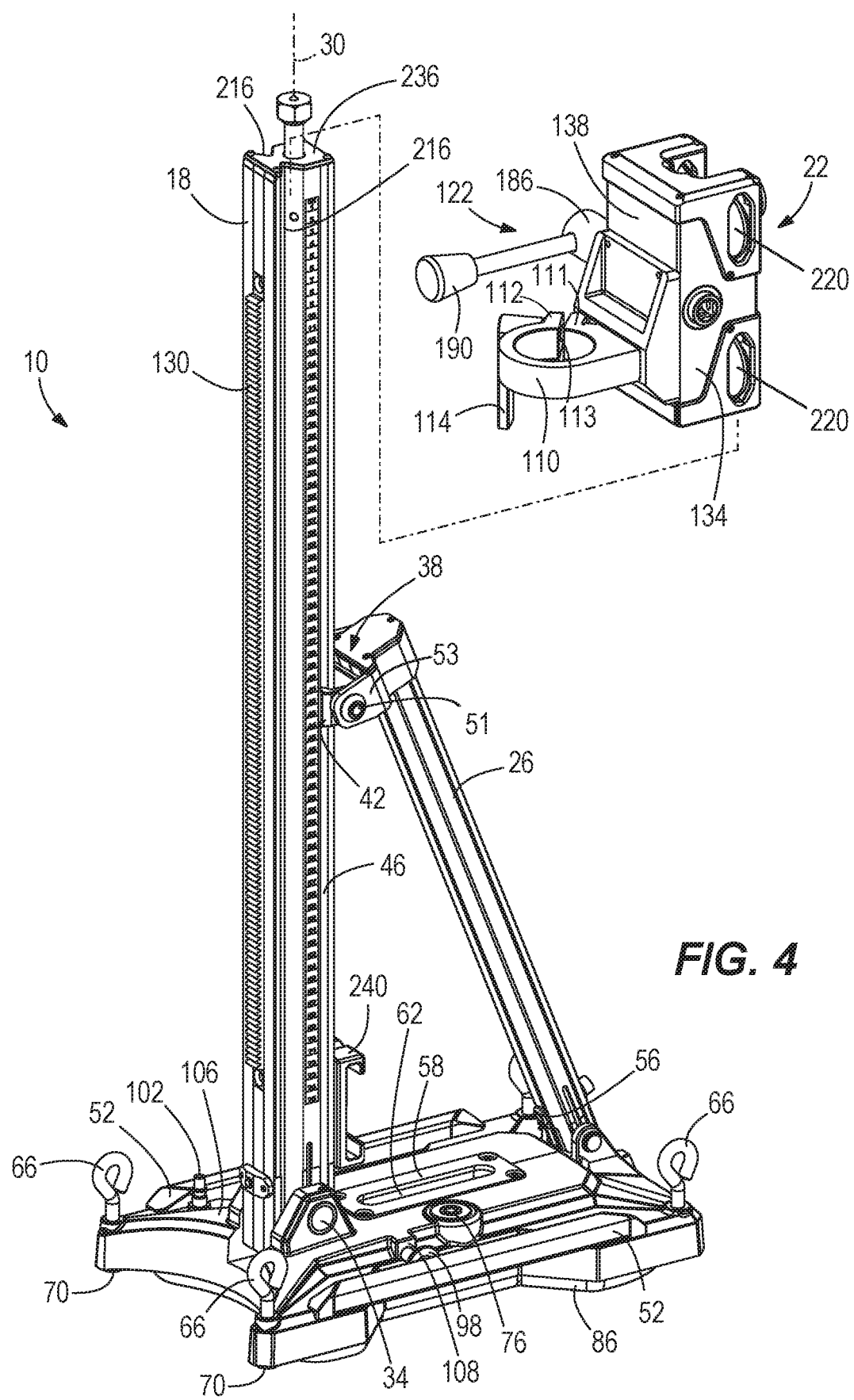
FIG. 4 is a perspective view of the drill stand of FIG. 1 with the core drill, the battery, and a carriage removed.

The support bracket 26 is moveably coupled to the mast 18 via a tool-free clamping mechanism 38 that selectively locks the support bracket 26 to the mast 18. As shown in FIG. 3, the clamping mechanism 38 includes a pair of clamping arms 42 positioned on respective rails 46 on the mast 18. The rails 46 are parallel to the longitudinal axis 30 of the mast 18. A handle 50 can be rotated to tighten the clamping arms 42 into the rails 46. Specifically, a bolt 51 is coupled for rotation with the handle 50. The bolt 51 extends through and is rotatable relative to both clamping arms arms 42 and a pair of brackets 53 that support clamping arms 42. Thus, when the handle 50 is rotated in tightening direction with respect to arms 42 (and brackets 53), the bolt 51 rotates and forces the handle-side bracket 53 to move towards the non-handle-side bracket 53, thus forcing the clamping arms 42 into the rails 46, causing the support bracket 26 to be locked with respect to the mast 18.

Alternatively, the handle 50 can by rotated in an opposite, loosening direction, which causes the bolt 51 to rotate and allow the handle-side bracket 53 to move away from the non-handle side bracket 5. In response, the clamping arms 42 naturally deflect outward away from rails 46, thereby allowing the support bracket 26 to move along the mast 18 via the arms 42 sliding within the rails 46. When the support bracket 26 is locked with respect to the mast 14, an operator may grasp the support bracket 26 to carry the drill stand 10. The base 14 also includes a pair of handles 52 on opposite sides of the base 14 that permit the operator to carry the drill stand 10.

Figure 5A:
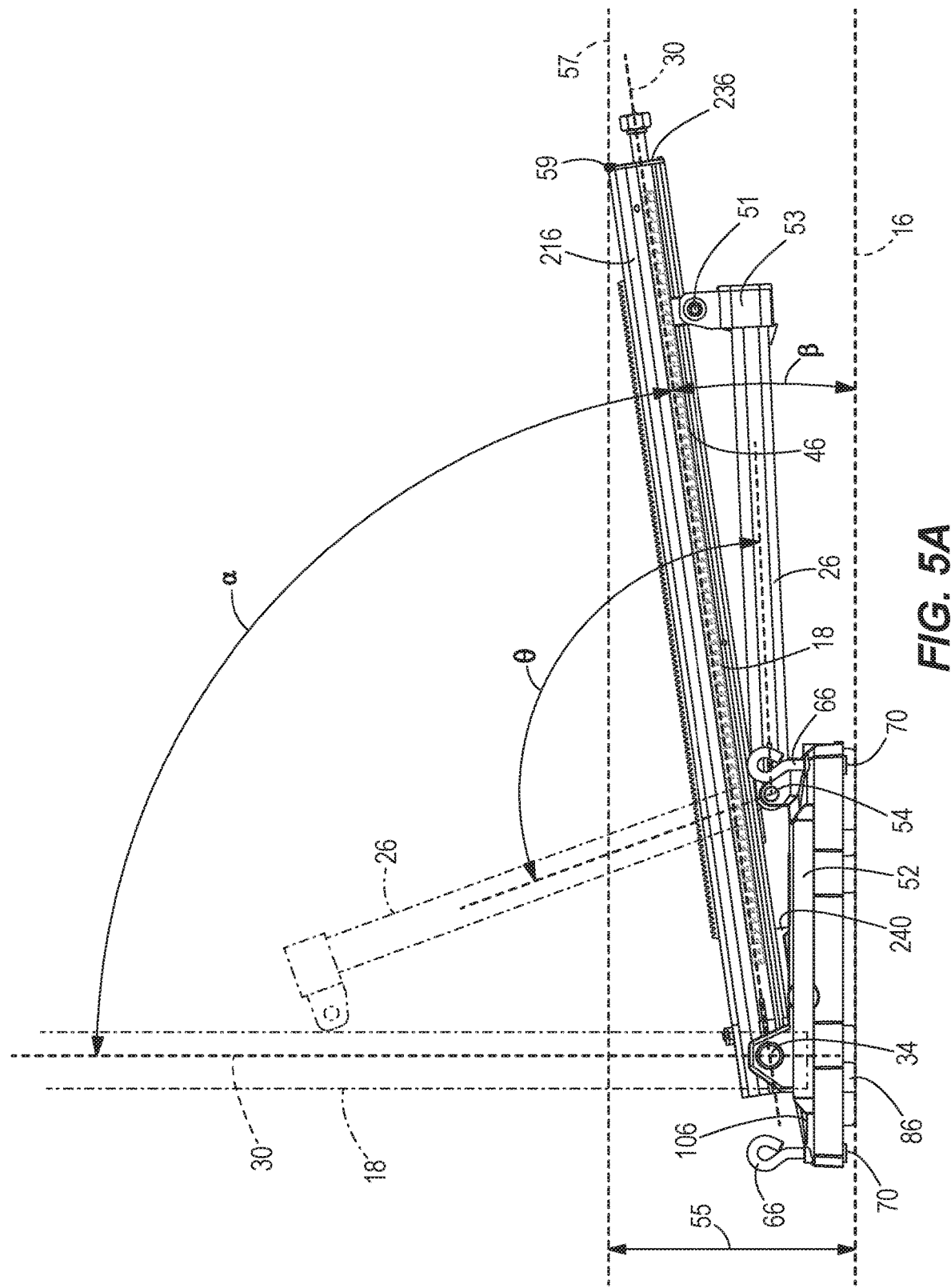
FIG. 5A is a perspective view of the drill stand of FIG. 1 shown in a collapsed configuration.
Figure 5B:
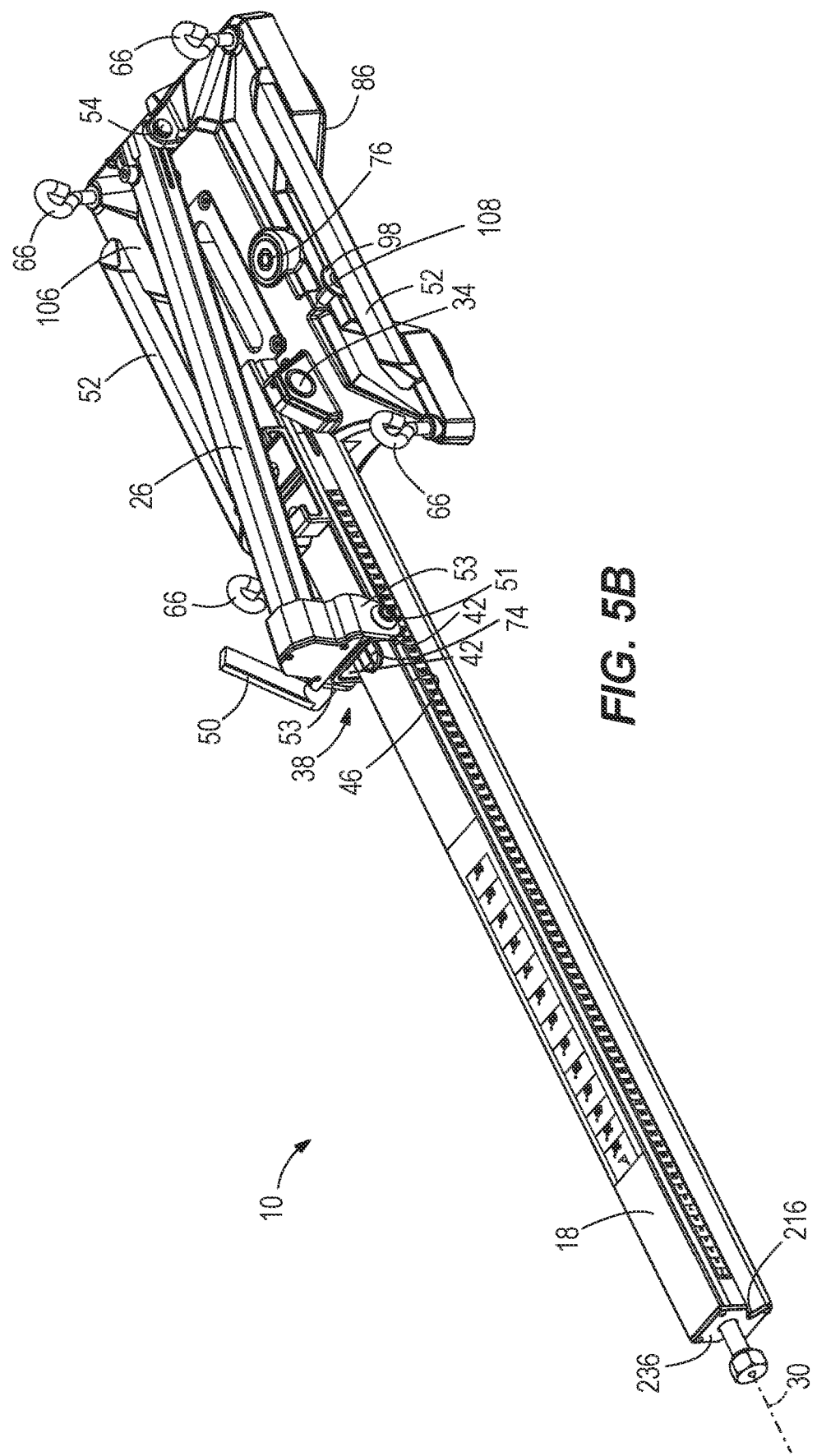
FIG. 5B is a plan view of the drill stand of FIG. 1 shown in an alternative collapsed configuration.

When the clamping arms 42 are loosened with respect to the rails 46, the mast 18 and support bracket 22 are collapsible relative to the base 14, as shown in FIGS. 5A and 5B. In the embodiment shown in FIG. 5A, as the mast 18 pivots about pivot joint 34 toward support bracket 26, the support bracket 26 also pivots about a pivot joint 54 while the clamping arms 42 slide along the rails 46 of the mast 18 away from pivot joint 34. An angle α is defined between the mast 18 in its collapsed position and the mast 18 in its original position shown in FIG. 4 and shown in phantom in FIG. 5A. In the collapsed position, an angle β is defined between the mast 18 and the mounting surface 16. An angle θ is defined between the support bracket 26 in its collapsed position and the support bracket 26 in its original position shown in FIG. 4 and shown in phantom in FIG. 5A. In the embodiment illustrated in FIG. 5A, α is 83 degrees, β is 7 degrees, and θ is 109 degrees. However, in other embodiments, α, β, and θ can be other values, with α and β always totaling 90 degrees. In some embodiments, once collapsed, the total vertical height 55 of the stand 10, measured from the mounting surface 16 to a plane 57 parallel to the mounting surface 16 and intersecting a vertically topmost point 59 of the stand 10 while collapsed, is approximately 13.5 inches. In other embodiments, the height 55 is less than 13.5 inches.

Alternatively, in another embodiment shown in FIG. 5B, the mast 18 and support bracket 26 are movable to an alternative collapsed configuration in which at least one of the mast 18 or the support bracket 26 is substantially parallel with the base 14. In the embodiment shown in FIG. 5B, as the mast 18 pivots about pivot joint 34 away from support bracket 26, the support bracket 26 also pivots about the pivot joint 54 while the clamping arms 42 slide along the rails 46 of the mast 18 toward the pivot joint 34. In the embodiment shown in FIG. 5B, the mast 18 is substantially parallel with the base 14. Because the support bracket 26 includes one or more bolts 56 extending therethrough (FIG. 4), the base 14 includes one or more recesses (not shown) to accommodate the one or more bolts 56 when the support bracket 26 has been moved to the collapsed configuration.

As shown in FIGS. 1-4, the base 14 includes a wear plate 58 having an elongated slot 62 through which a mounting bolt (not shown) may be inserted to secure the base 14 to the mounting surface 16 by, for example, setting the mounting bolt through the wear plate 58 and into a bore created in the mounting surface 16. The base 14 also includes a plurality of eyelet screws 66 that may be threadably adjusted with respect to the base 14 in order to vertically adjust respective feet 70 attached to the screws 66 with respect to the base 14. In the illustrated embodiment there are four screws 66 at four corners of the base 14, but in other embodiments there may be more or fewer screws 66, and the screws may be in different locations on the base 14. The operator may adjust the height and orientation of the base 14 with respect to the mounting surface 16 by adjusting one or more of the screws 32 with respect to the base 14. As shown in FIG. 3, the mast 18 also includes a bubble level 74 and the base 14 includes a bullseye level 76. Thus, if an operator mounts the base 14 to a vertical mounting surface 16, the bubble level 74 can help an operator level the mast 18 and ensure it is parallel to the ground surface. Similarly, if an operator mounts the base 14 to a horizontal mounting surface 16, the bullseye level 76 can help an operator level the base 14 and ensure it is parallel to the ground surface.

Figure 6:
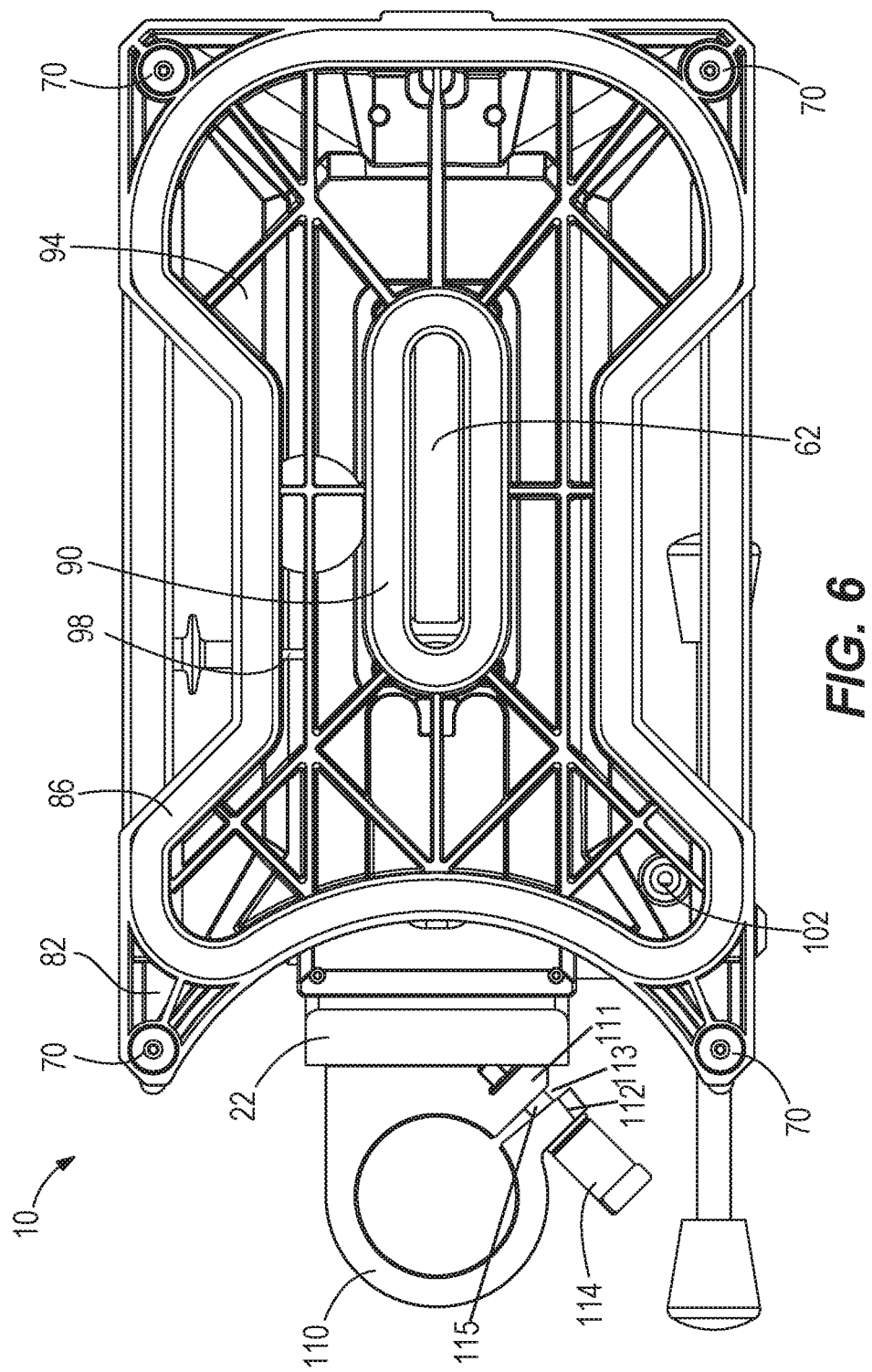
FIG. 6 is a bottom view of the drill stand of FIG. 1.

As shown in FIG. 6, a bottom side 82 of the base 14 includes a first, outer gasket 86 and a second, inner gasket 90. The inner gasket 90 is arranged inside the outer gasket 86 and outside the slot 62, such that a vacuum chamber 94 is defined between the first gasket 86, the second gasket 90, the bottom side 82 of the base 14, and the mounting surface 16 when the base 14 is on the mounting surface 16. The base 14 includes a quick release valve 98 (FIGS. 1-6) and a vacuum port 102 (FIG. 1). The vacuum port 102 extends from a top side 106 of the base 14 to the vacuum chamber 94. The quick release valve 98 extends from a side wall 108 of the base 14 to the vacuum chamber 94. Thus, when the first and second gaskets 86, 90 are engaged against the mounting surface 16, the operator may attach a vacuum source to the vacuum port 102 on the top side 106 of the base 14, and operate the suction source to create a vacuum in the vacuum chamber 94. In this manner, the vacuum in the vacuum chamber 94 secures the base 14 to the mounting surface 16. When the operator desires to remove the base 14 from the mounting surface 16, the operator can actuate the quick release valve 98, causing ambient air at atmospheric pressure to enter the vacuum chamber 94, which breaks the vacuum and allows the operator to remove the base 14.

As shown in FIGS. 1-4, the carriage 22 includes an annular collar 110 for securing the core drill 36. The collar 110 includes a fixed end 111 and a moveable end 112. A gap 113 is defined between the two ends 111, 112. A handle 114 is arranged on and rotatable with respect to the fixed end 111.

A fastener 115 (FIG. 6) is coupled for rotation with the handle 114 and extends through and is rotatable with respect to the ends 111, 112. When the handle 114 is rotated in a tightening direction, the fastener 115 rotates in a direction towards the carriage 22, forcing the moving end 112 closer to the fixed end 111, reducing the gap 113 and thereby securing the core drill 36. When the handle 114 is rotated in an opposite, loosening direction, the fastener 115 rotates away from the carriage 22, allowing the moving end 112 to deflect away from the fixed end 11, increasing the size of the gap 113 and thereby allowing the core drill 36 to be removed from the collar 110. The collar 110 can be alternatively tightened and loosed by rotating a handle 114, thus allowing an operator to selectively secure (FIG. 1) and remove (FIGS. 2-5) the core drill 36 from the collar 110.

Figure 7:
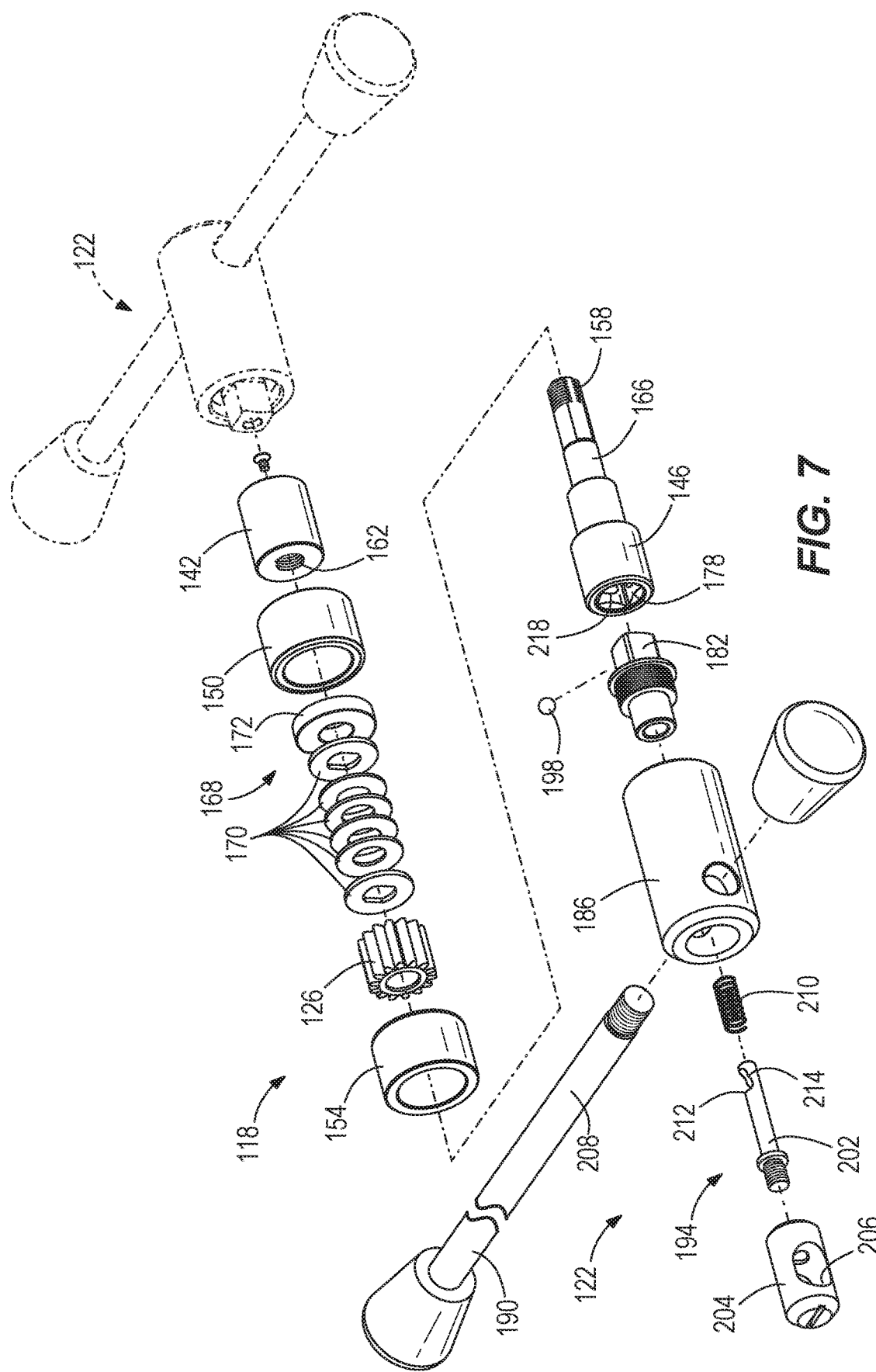
FIG. 7 is an exploded view of a spindle assembly in the carriage of the drill stand of FIG. 1.
Figure 8:
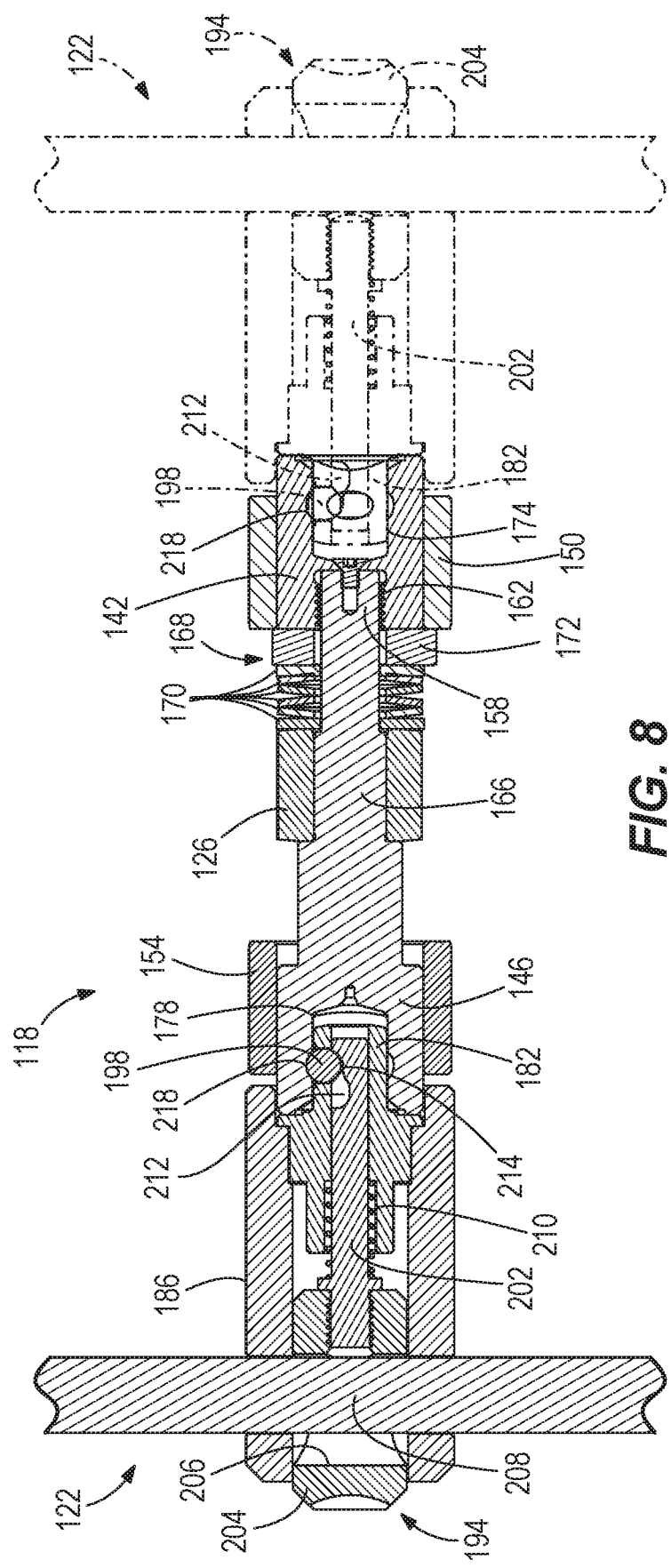
FIG. 8 is a cross-sectional view of the spindle assembly of FIG. 7.

As shown in FIGS. 7 and 8, the carriage 22 includes a spindle assembly 118 for moveably adjusting the carriage 22 along the mast 18, and a handle assembly 122 for driving the spindle assembly 118. The spindle assembly 118 includes a pinion 126 that is drivingly engaged with a rack 130 included on the mast 18. As described in further detail below, the handle assembly 122 is removably coupled to either end of the spindle assembly 118 without the use of tools. The handle assembly 122 can be interchangeably coupled to the spindle assembly 118 on either a first side 134 of the carriage 22 or an opposite second side 138 of the carriage 22. In this manner, an operator may attach the handle assembly 122 select to either one of the sides 134, 138, depending on user preference or work environment constraints. With reference to FIGS. 1-3, 7 and 8, the handle assembly 122 is shown positioned on the second side 138 of the carriage 22. However, as shown in FIGS. 7 and 8, a second instance of the handle assembly 122 is shown in phantom on the first side 134 of the carriage 22 to illustrate its alternative position.

With continued reference to FIGS. 7 and 8, the spindle assembly 118 includes a first spindle 142 proximate to and accessible from the first side 134 of the carriage 22 and a second spindle 146 proximate to and accessible from the second side 138 of the carriage 22. The spindle assembly 118 includes a first bushing 150 positioned around the first spindle 142 and a second bushing 154 positioned around the second spindle 146. The bushings 150, 154 rotatably support the spindles 142, 146, respectively, and are interference fit to the carriage 22, preventing the bushings 150, 154 themselves from rotating. The second spindle 146 includes a threaded shank 158 received within a threaded bore 162 in the first spindle 142 to thereby unitize the spindles 142, 146 for co-rotation. Alternatively, the spindles 142, 146 may be non-rotatably and axially coupled in different manners. The second spindle 146 also includes a cylindrical portion 166 upon which the pinion 126 is press fit. Thus, the pinion 126 co-rotates with the second spindle 146 in response to a torque input to either of the spindles 142, 146 via the handle assembly 122, causing the carriage 22 to move up and down the mast 18.

The spindle assembly 118 also includes a brake mechanism 168 that prevents the spindles 142, 146 and pinion 126 from rotating when the operator is not holding the handle assembly 122. A plurality of washers 170 are positioned around the cylindrical portion 166 between the first spindle 142 and the pinion 126. In the embodiment illustrated in FIGS. 7 and 8, the brake mechanism 168 comprises one or more Belleville washers amongst the plurality of watchers 170 and a bushing 172 fixed within carriage 22. The one or more Belleville washers exert a predetermined axial preload force on the pinion 126 in a direction away from bushing 172, such that the second spindle 146 is likewise biased in the same direction. Because the first spindle 142 is threadably coupled to the second spindle 146 via the threaded shank 158 within the threaded bore 162, the first spindle 142 is pulled by the second spindle 146 against the bushing 172, creating friction therebetween.

The friction between the first spindle 142 and the bushing 172 is sufficiently high to prevent to prevent the spindles 142, 146 from rotating due to the weight of the carriage 22 or core drill 36 pulling down on the carriage 22 and pinion 126 when the operator is not holding the handle assembly 122 or carriage 22. However, the friction between the first spindle 142 and the bushing 172 is sufficiently low that when an operator applies torque to the spindles 142, 146 via the handle assembly 122, the first spindle 142 is able to rotate relative to the bushing 172, along with the second spindle 146 and pinion 126. Thus, the brake mechanism 168 prevents the carriage 22 from moving downward along the mast 18 due to the force of gravity absent the operator applying a force via the handle assembly 122, but permits the operator 22 to move the carriage 22 along the mast 18 by rotating the handle assembly 122, as described in further detail below.

The first spindle 142 defines a first non-cylindrical drive socket 174 (FIG. 8) accessible from the first side 134 of the main carriage 22 and the second spindle 146 defines a second non-cylindrical drive socket 178 (FIGS. 7 and 8) accessible from the second side 138 of the carriage 22. The drive sockets 174, 178 are each operable to receive a corresponding-shaped drive member 182 of the handle assembly 122. In the illustrated embodiment of the drill stand 10, the drive sockets 174, 178 and the drive member 182 each have a corresponding square cross-sectional shape. Alternatively, the drive sockets 174, 178 and the drive member 182 may be configured having different corresponding non-cylindrical shapes.

The handle assembly 122 also includes a handle hub 186 from which the drive member 182 extends and two levers 190 extending from opposite sides of the handle hub 186. The handle assembly 122 further includes quick-release mechanism 194 for selectively locking the handle assembly 122 to the spindle assembly 118. In the illustrated embodiment, the quick-release mechanism 194 includes a ball detent 198 in one of the faces of the drive member 182 and a plunger 202 coaxial with the hub 186 and drive member 182 for biasing the ball detent 198 toward a position in which at least a portion of the ball detent 198 protrudes from the face of the drive member 182 in which it is located (i.e., an extended position).

In the illustrated embodiment, the plunger 202 is coupled for axial movement with a release actuator 204 arranged on handle hub 186. The release actuator 204 defines a slot 206 through which an extension 208 coupling the two levers 190 extends. The release actuator 204 is biased away from the drive member 182 by a spring 210, which is set between the drive member 182 and release actutator 204. The slot 206 is long enough to permit the release actuator 204 to move within the handle hub 186 between an outwardly-biased position and an inwardly-depressed position, against the force of spring 210.

As shown in FIGS. 7 and 8, the plunger 202 includes a notch 212. When the release actuator 204, and therefore the plunger 202, are depressed inwardly by an operator, the plunger 202 moves towards the ball detent 198, thus allowing the ball detent 198 to be received into the notch 212. When the release actuator 204 and the plunger 202 are allowed to return to their outwardly-biased positions by the spring 210, a ramp surface 214 on the plunger 202 adjacent the slot 212 displaces the ball detent 198 radially outward, causing a portion of the ball detent 198 to protrude from the drive member 182 and engage a corresponding detent recess 218 in the drive sockets 174, 178 (FIGS. 7 and 8), thereby axially retaining the handle assembly 122 to the spindle assembly 118.

In operation, an operator depresses and holds the release actuator 204 and while holding the release actuator 204, the operator couples the handle assembly 122 to the spindle assembly 118 by inserting the square drive 182 into either the first drive socket 174 or the second drive socket 178. Once inserted, the operator releases the release actuator 204, which causes the ramp surface 214 to force the ball detent 198 into the detent recess 218 of the first drive socket 174 or second drive socket 178, thereby axially retaining the handle assembly 122 to the spindle assembly 118. The operator then rotates the handle assembly 122 to reposition the carriage 22 with respect to the mast 18. To remove the handle assembly 122 for storage or for repositioning to the other side of the carriage 22, the operator depresses the release actuator 204 against the bias of the spring 206, moving the plunger 202 into a position in which the ball detent is received into the notch 212. With the ball detent 198 in the notch 212, no portion of the ball detent 198 protrudes from the drive member 182 for engaging the detent recesses 218, thereby permitting removal of the handle assembly 122 from either the first drive socket 174 or the second drive socket 178. To reattach the handle assembly 122 to either side of the spindle assembly 118, the operator needs only to push the drive member 182 into one of the drive sockets 174, 178.

Interference between the ball detent 198 and the drive sockets 174, 178 displaces the ball detent 198 inward. A component of the ball detent 198 displacement is redirected axially by the ramp surface 214, against the bias of the spring 206, causing the plunger 202 to automatically retract into the hub 186 during insertion of the drive member 182 into one of the drive sockets 174, 178. Upon receipt of the ball detent 198 into one of the detent recesses 218 in the drive sockets 174, 178, the handle assembly 122 is again locked to the spindle assembly 118.

With reference to FIGS. 1-4, the mast 18 defines grooves 216 that are parallel to the longitudinal axis 30 and arranged on opposite sides of the mast 18. In the illustrated embodiment the mast 18 includes two grooves 216 but in other embodiments the mast 18 may include more or fewer grooves 216. The carriage 22 includes rollers 220 arranged in the grooves 216. In the illustrated embodiment, the carriage 22 includes four rollers 220, but in other embodiments, the carriage 22 may include more or fewer rollers 220. In response to the carriage 22 moving relative to the mast 18 in a direction parallel to the longitudinal axis 30, as described above, the rollers roll along the grooves 216, thus facilitating smooth translation of the carriage 22 along the mast 18.

Because the grooves 216 extend all the way to a top 236 of the mast 18, the carriage 22 is removable from the mast 18 in a direction parallel to the longitudinal axis 30 in a tool-free manner. Specifically, an operator may simply slide the carriage 22 off the top of the mast 18 (FIG. 4), because nothing at the top 236 of the mast 18 blocks or otherwise prevents the rollers 220 from rolling off the grooves 216 or the pinion 126 from disengaging the rack 130. The capability to remove the carriage 22 from the mast 18 in a tool-free manner simplifies disassembly and removal of the drill stand 10 from the work site. In other embodiments, the carriage 22 may be removable from the mast 18 in a direction transverse to the longitudinal axis 30.

As shown in FIGS. 1-4, the drill stand 10 includes a battery mount 240 that selectively receives a battery 244 (FIG. 1) that can power the core drill 36. In the illustrated embodiment, the battery mount 240 is attached to the mast 18 within a space bounded by the mast 18, the support bracket 26, and the base 14. Therefore, the battery 244 is positioned within this same space when not in use. In other embodiments (not shown), the battery mount 240 may be arranged on the support bracket 26 but within the same space bounded by the mast 18, the support bracket 26, and the base 14 to provide protection for the battery 244. As shown in FIGS. 1-4, the battery mount 240 is a bracket with a C-shaped cross section that receives a mating portion of the battery 244. Because the drill stand 10 includes the battery mount 240 for the battery 244, the operator can always have a spare (charged) battery 244 ready for the core drill 26 in case the battery 244 on the core drill 26 requires recharging.

Various features of the invention are set forth in the following claims.

What is claimed is:

1. A drill stand comprising:
   a base;
   a mast defining a longitudinal axis and pivotably coupled to the base;
   a support bracket moveably coupled to the mast and pivotably coupled to the base; and
   a carriage moveably coupled to the mast,
   wherein the carriage is configured to selectively receive a drill and is selectively removable from the mast in a tool-free manner.

2. The drill stand of claim 1, wherein the carriage is removable from the mast in a direction parallel to the longitudinal axis.

3. The drill stand of claim 2, wherein the mast defines a groove in a direction parallel with the longitudinal axis, wherein the carriage includes a roller arranged in the groove, and wherein the roller rolls along the groove in response to the carriage moving relative to the mast in a direction parallel with the longitudinal axis.

4. The drill stand of claim 1, wherein the mast and support bracket are collapsible relative to the base.

5. The drill stand of claim 4, wherein the mast and support bracket are movable to a collapsed configuration in which at least one of the mast or the support bracket is substantially parallel with the base.

6. The drill stand of claim 5, wherein one of the mast or the support bracket includes a bolt, and wherein the base includes a recess configured to receive the bolt when the mast and the support bracket are moved to the collapsed configuration.

7. The drill stand of claim 1, wherein the base includes, on a bottom side thereof, a first gasket and a second gasket disposed within the first gasket, such that a vacuum chamber is defined between the first gasket, the second gasket, the bottom side of the base, and a mounting surface on which the base is configured to be mounted, and wherein a port is arranged on the underside of the base in fluid communication with the vacuum chamber, the port configured to be coupled to a vacuum source such that a vacuum may be created in the vacuum chamber when the first gasket and second gasket are engaged with the mounting surface.

8. The drill stand of claim 7, wherein the base includes a valve in fluid communication with the vacuum chamber, and wherein ambient air at atmospheric pressure is permitted to enter the vacuum chamber in response to actuation of the valve.

9. The drill stand of claim 1, wherein the base includes a plurality of screws moveable relative to the base to adjust the height and orientation of the base with respect to a mounting surface on which the base is configured to be mounted.

10. The drill stand of claim 9, wherein the mast includes a bubble level for indicating the orientation of the mast relative to the mounting surface.

11. The drill stand of claim 1, wherein the base includes a handle, and wherein the support bracket is configured to be locked with respect to the base and the mast, such that an operator may carry the drill stand with the handle and/or the support bracket.

12. The drill stand of claim 1, wherein the base includes a pair of handles located on opposite sides of the base.

13. The drill stand of claim 1, wherein the mast includes a rack, wherein the carriage includes a pinion engaged with and moveable along the rack and a handle which, when rotated, applies torque to the pinion causing it to rotate and move along the rack, causing the carriage to move relative to the mast.

14. The drill stand of claim 13, further comprising a brake mechanism configured to prevent the pinion from moving along the rack absent an external force applied to the handle.

15. The drill stand of claim 14, wherein the brake mechanism comprises a spindle coupled for co-rotation with the handle, a bushing fixed on the carriage, and a biasing member that biases the spindle against the bushing with a predetermined force.

16. The drill stand of claim 14, wherein the pinion is press fit to a spindle that rotates in response to rotation of the handle, such that in response to rotation of the handle, the pinion rotates and moves along the rack.

* * * * *